(12) United States Patent
Jeng et al.

(10) Patent No.: US 8,527,746 B2
(45) Date of Patent: Sep. 3, 2013

(54) ELECTRONIC DEVICE CAPABLE OF STARTING UP IN LOW-TEMPERATURE ENVIRONMENT AND STARTUP METHOD THEREOF

(75) Inventors: Alex W Jeng, Taipei (TW); Chien Ming Huang, Taipei (TW)

(73) Assignee: MSI Computer (Shenzhen) Co., Ltd., Shenzhen, Guangdong Province (CN)

( * ) Notice: Subject to any disclaimer, the term of this patent is extended or adjusted under 35 U.S.C. 154(b) by 401 days.

(21) Appl. No.: 12/978,849

(22) Filed: Dec. 27, 2010

(65) Prior Publication Data

US 2012/0005469 A1    Jan. 5, 2012

(30) Foreign Application Priority Data

Jun. 30, 2010  (TW) ................................ 99121567 A

(51) Int. Cl.
- G06F 15/177 (2006.01)
- G01K 7/00 (2006.01)
- G11B 15/18 (2006.01)

(52) U.S. Cl.
USPC ................................ 713/2; 702/130; 360/69

(58) Field of Classification Search
USPC ............................................................ 713/2
See application file for complete search history.

(56) References Cited

U.S. PATENT DOCUMENTS

| | | | | |
|---|---|---|---|---|
| 5,164,849 A | * | 11/1992 | Evans et al. | 349/72 |
| 6,735,035 B1 | * | 5/2004 | Smith et al. | 360/69 |
| 7,641,386 B2 | * | 1/2010 | Chen et al. | 374/141 |
| 7,813,072 B2 | * | 10/2010 | Son et al. | 360/69 |
| 8,263,911 B2 | * | 9/2012 | Yen | 219/481 |
| 2011/0266356 A1 | * | 11/2011 | Lin et al. | 237/2 A |

FOREIGN PATENT DOCUMENTS

| | | | |
|---|---|---|---|
| JP | 09285166 A | * | 10/1997 |
| JP | 2003216280 A | * | 7/2003 |
| JP | 2004185439 A | * | 7/2004 |

* cited by examiner

*Primary Examiner* — Suresh Suryawanshi

(74) *Attorney, Agent, or Firm* — Morris Manning & Martin LLP; Tim Tingkang Xia, Esq.

(57) ABSTRACT

An electronic device capable of starting up in a low-temperature environment and a startup method for starting up the electronic device in the low-temperature environment and provide a stable operation temperature. The electronic device includes a temperature detection unit, a plurality of electronic elements, a storage unit, and a control unit. The electronic elements connects to the temperature detection unit. The storage unit stores a temperature monitoring process and an operating system. The control unit electrically connects to the temperature detection unit, the electronic elements, and the storage unit. The control unit acquires an operation temperature of the electronic elements through the temperature detection unit. The control unit executes the temperature monitoring process for driving the electronic elements, and increases the operation temperature of the electronic elements, so that the operating system is executed when a working temperature of the electronic device is higher than a first rated temperature.

10 Claims, 10 Drawing Sheets

ELECTRONIC DEVICE CAPABLE OF STARTING UP IN LOW-TEMPERATURE ENVIRONMENT AND STARTUP METHOD THEREOF

CROSS-REFERENCE TO RELATED APPLICATIONS

This non-provisional application claims priority under 35 U.S.C. §119(a) on Patent Application No(s). 099121567 filed in Taiwan, R.O.C. on Jun. 30, 2010, the entire contents of which are hereby incorporated by reference.

BACKGROUND OF THE INVENTION

1. Field of the Invention

The present invention relates to an electronic device and a control method thereof, and more particularly to an electronic device capable of starting up in a low-temperature environment and a startup method thereof.

2. Related Art

With the improvement of the manufacturing process of electronic elements, electronic devices are becoming light, thin, short, and small. Hence, a user can easily carry the electronic device to a desired place. However, the electronic device does not operate in any environment temperature.

FIGS. 1A and 1B are schematic views of conductivity at various temperatures of a conductor and a semiconductor in the prior art respectively, in which the horizontal axis represents a temperature value, and the vertical axis represents a resistance value. The temperature poses different influences on resistance values of different substances. When an conductor is at a temperature close to the room temperature, a resistance value of a conductor generally is in direct proportion to the temperature. In other words, the higher the temperature is, the larger the resistance value will be:

$$R=R_0+aT \qquad \text{Equation 1}$$

where a is a resistance temperature coefficient, and R is the resistance value of the conductor, T is the temperature, $R_0$ is the resistance when the temperature at 0° C.

However, the resistance of an undoped semiconductor decreases when the temperature increases, which are in a geometrical relationship.

$$R=R_0 e^{a/T} \qquad \text{Equation 2}$$

where a is a resistance temperature coefficient, and R is the resistance value of the conductor, T is the temperature, $R_0$ is the resistance when the temperature at 0° C.

However, variance of a doped semiconductor is more complex. When the temperature rises from the absolute zero, at first, resistance of the semiconductor decreases, and after a great majority of charged particles (electrons or holes/cavities) leave their carriers, the resistance slightly increases with the rising of the temperature due to reduction of activity of the charged particles. When the temperature further rises, the semiconductor generates new carriers (same as the undoped semiconductor), so the original carriers (which are generated due to the doping) become less important, and the resistance decreases once again.

For example, the electronic device includes a circuit loop formed by a plurality of electronic elements. When the electronic elements are driven by a current, the electronic elements generates the signal for processing. However, the activity of the electrons is reduced because of the low-temperature environment (such as an environment below zero degree), so the current cannot be conducted smoothly, and thereby the electronic device operated unsuccessfully. For example, when a startup switch on the electronic device is pressed down, the current drives each electronic element according to layout of the circuit loop. When the current cannot pass through a certain electronic element, startup conditions of the circuit loop cannot be satisfied, so that the electronic device crashes. From a macroscopic point of view, the electronic device gives no response at all, which is the same as crashing; however, from a microscopic point of view, because the current in the electronic device cannot pass through a certain electronic element, or the current passing through the electronic element is too weak, the electronic element cannot be smoothly enabled.

To solve the problem that the electronic device cannot be started up in the low-temperature environment, one method is to add a heating unit (such as a heater) in the electronic device. The heater can increase a temperature within the electronic device, so that each electronic element of the electronic device reaches a required startup temperature. Although the added heating unit can quickly increase the temperature of the electronic device, the heating unit increases the volume of the electronic device. Furthermore, for a manufacturer of the electronic device, the manufacturing cost also increases. Moreover, because power consumption of the heating unit is far higher than that of the electronic elements, power of the electronic device is also consumed at the same time as heating. As a result, the power of the electronic device may be exhausted although the electronic elements reach a temperature at which they can operate.

SUMMARY OF THE INVENTION

Accordingly, the present invention is directed to an electronic device capable of starting up in a low-temperature environment, so that the electronic device can increase a temperature thereof in the low-temperature environment.

To achieve the foregoing objective, the electronic device capable of starting up in the low-temperature environment according to the present invention comprises a temperature detection unit, a plurality of electronic elements, a storage unit, and a control unit. The storage unit stores a temperature monitoring process and a full load process.

The control unit acquires an operation temperature of the electronic element through the temperature detection unit. The control unit executes the temperature monitoring process and the full load process. The full load process increases a current of the electronic elements for driving the electronic elements, so that the current temperature of the electronic elements are higher than a second rated temperature of the electronic elements. The temperature monitoring process calculates a working temperature of the electronic device according to the current temperature of all the electronic elements, and judges whether the working temperature is higher than a first rated temperature.

Further, the present invention provides a startup method of an electronic device in a low-temperature environment, so that after the electronic device accomplishes is powered on in the low-temperature environment, a temperature of the electronic device is increased.

To achieve the foregoing objective, the startup method of the electronic device in the low-temperature environment according to the present invention comprises the following steps. The electronic device is started up. A temperature monitoring process is executed. The temperature monitoring process obtains a temperature of electronic elements. If the temperatures of the electronic elements are lower than a first rated temperature, a full load process is executed. The full load process drives the plurality of electronic elements, and the full load process increases an operation current of the electronic elements, thereby increasing the temperatures of the electronic elements, so that a working temperature of the electronic device is higher than the first rated temperature. When the working temperature of the electronic device is higher than the first rated temperature, the electronic device executes a power-on process.

The driving the electronic elements further comprises the following steps. The temperature monitoring process loads a driving sequence of the electronic elements. According to the driving sequence of the electronic elements, the temperature monitoring process drives the electronic element, and detects an operation temperature of the electronic element. If the operation temperature of the electronic element is higher than a second rated temperature, the temperature monitoring process selects a next electronic element according to the driving sequence of the electronic elements, and drives the electronic element, until all the electronic elements are driven. The temperature monitoring process obtains the operation temperature of the electronic elements for calculating the working temperature of the electronic device.

In addition to the foregoing processing manner of driving the electronic elements, a startup method of an electronic device in a low-temperature environment is provided, so that after the electronic device is powered on in the low-temperature environment, a temperature of the electronic device is increased. The startup method comprises the following steps.

The electronic device enters an operation mode. A temperature monitoring process is executed for acquiring a working temperature of a plurality of electronic elements. It is decided to drive the electronic elements with an enhanced load process according to the working temperature, thereby increasing the temperatures of the electronic elements, so that a working temperature of the electronic device is higher than a first rated temperature. When the working temperature of the electronic device is higher than the first rated temperature, the electronic device loads a weighted load process after completing a power-on process. The weighted load process decides a heating sequence of the electronic elements.

The electronic device capable of temperature regulation and control and the regulation and control method thereof according to the present invention can enable the electronic device to maintain an operation temperature of the electronic device in a low-temperature environment, so that related applications can run on the electronic device stably.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
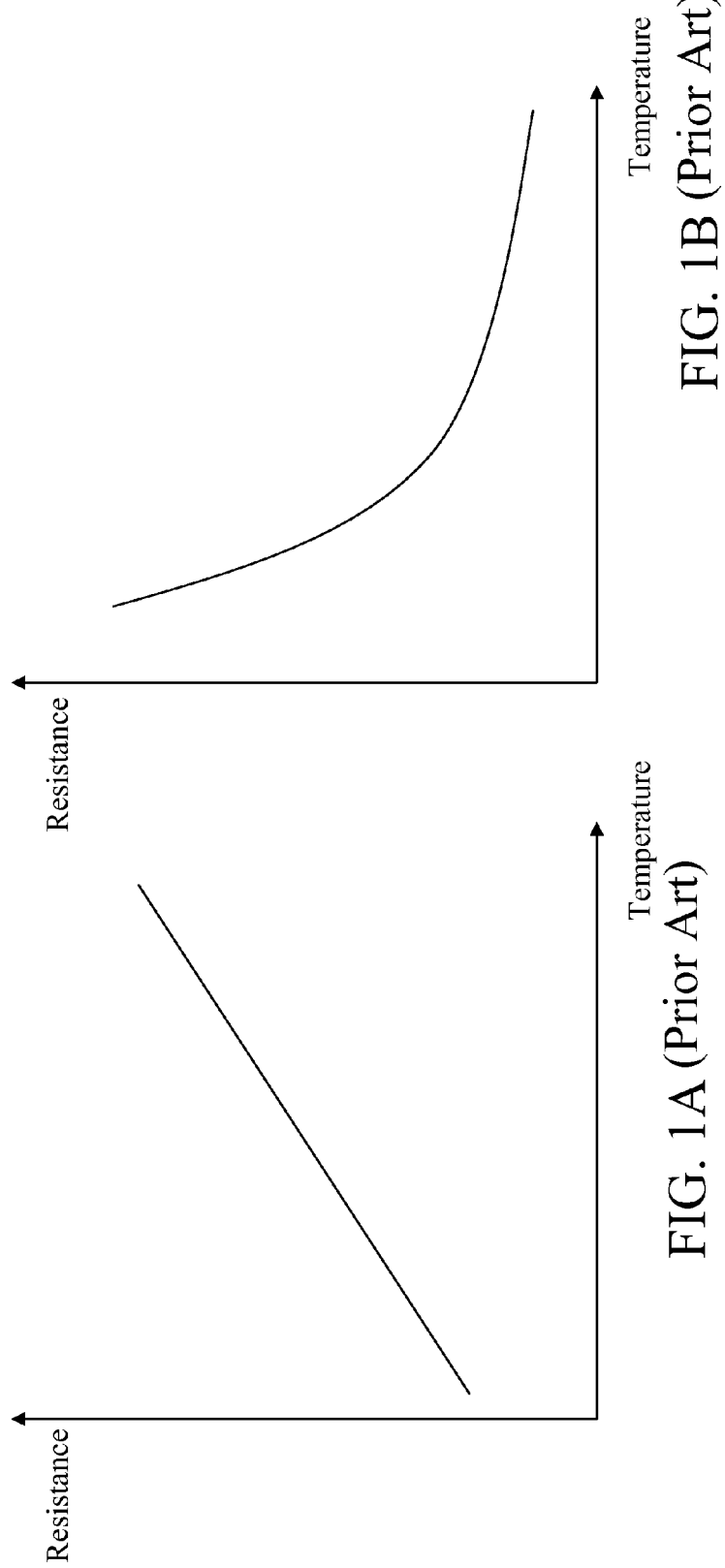
FIG. 1A is a schematic view of conductivity at various temperatures of a conductor in the prior art.
FIG. 1B is a schematic view of conductivity at various temperatures of a semiconductor in the prior art.
Figure 2:
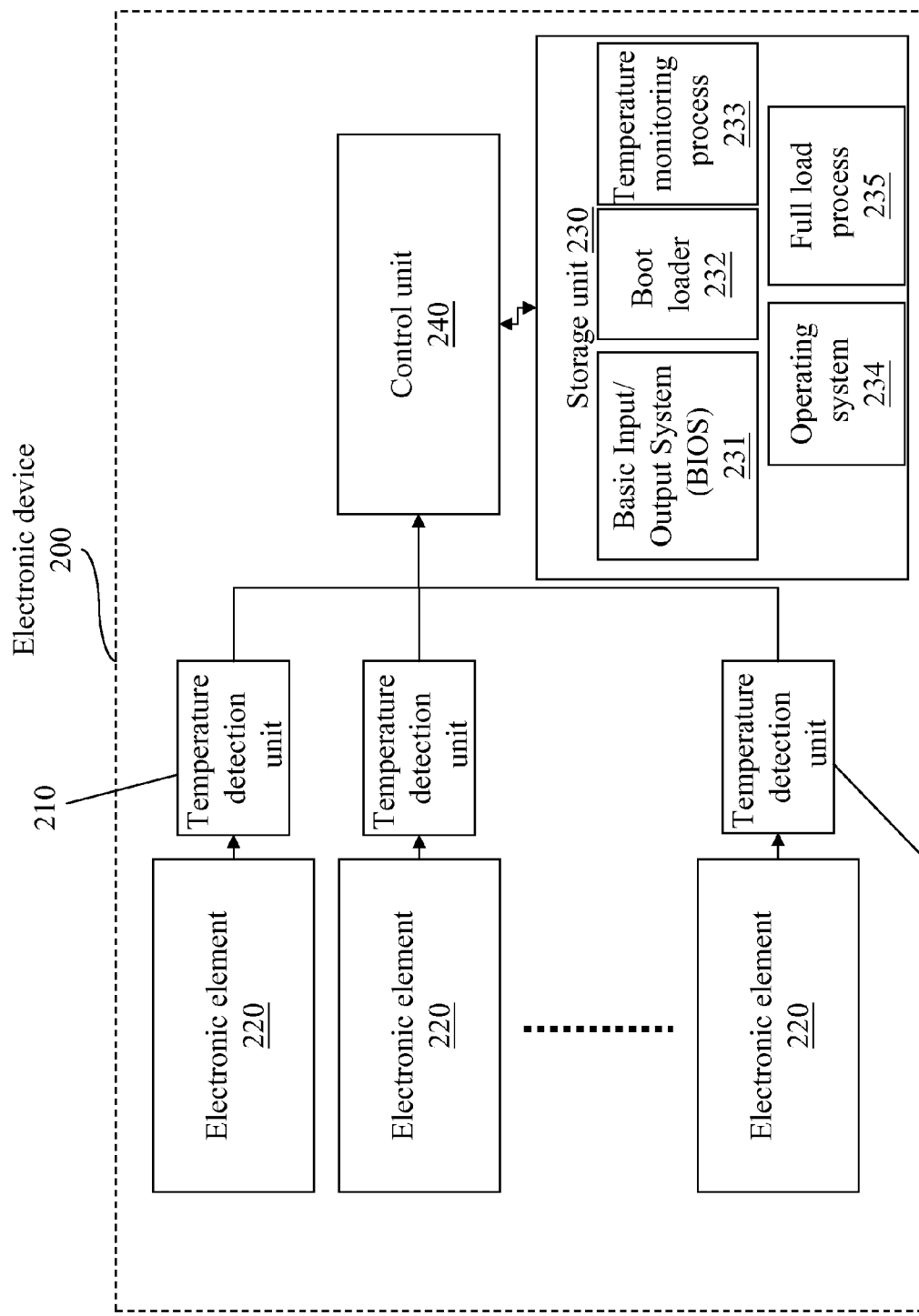
FIG. 2 is a schematic view of hardware architecture of an electronic device according to the present invention.

The electronic device according to the present invention can be applied in a personal computer, a laptop computer, a tablet computer, a Personal Digital Assistant (PDA) or a multimedia player. FIG. 2 is a schematic view of the hardware architecture of an electronic device according to an embodiment of the present invention. Referring to FIG. 2, the electronic device 200 comprises temperature detection units 210, a plurality of electronic elements 220, a storage unit 230, and a control unit 240.

An electronic element 220 may be, but is not limited to, a south bridge chip, a north bridge chip, a memory, a display chip, a network chip or an audio chip. The electronic elements 220 are connected to the temperature detection units 210, and the number of the temperature detection units 210 may changes according to other embodiments of the invention (which will be explained later). The storage unit 230 may be an Erasable Programmable Read Only Memory (EPROM), a FLASH memory or a hard disk. The storage unit 230 stores a Basic Input/Output System (BIOS) 231, a boot loader 232, a temperature monitoring process 233, an operating system 234 or a full load process 235. The control unit 240 is electrically connected to the temperature detection units 210, the electronic elements 220, and the storage unit 230. The control unit 240 acquires operation temperatures of the electronic elements 220 through the temperature detection units 210. The temperature monitoring process 233 according to the present invention can be set in the BIOS or boot loader, and is started when the electronic device 200 is started up. The full load process 235 is used to increase an operation clock or working voltage of the electronic elements 220. Besides accelerating the computation speed, the increase of the operation clock or working voltage of the electronic elements 220 also incurs more heat. The control unit 240 may be an independent entity, or be implemented with a Central Processing Unit (CPU). When the electronic device 200 is started up, if a current temperature of the control unit 240 is lower than a workable temperature, a current repeatedly passes through the control unit 240. In this way, the control unit 240 is continuously heated by the current, so as to increase the current temperature of the control unit 240 to an operable temperature. Alternatively, an independent heating unit (heater) is disposed in the control unit 240. In this way, the temperature of the control unit 240 can also be provided without occupying a large volume.

Figure 3:
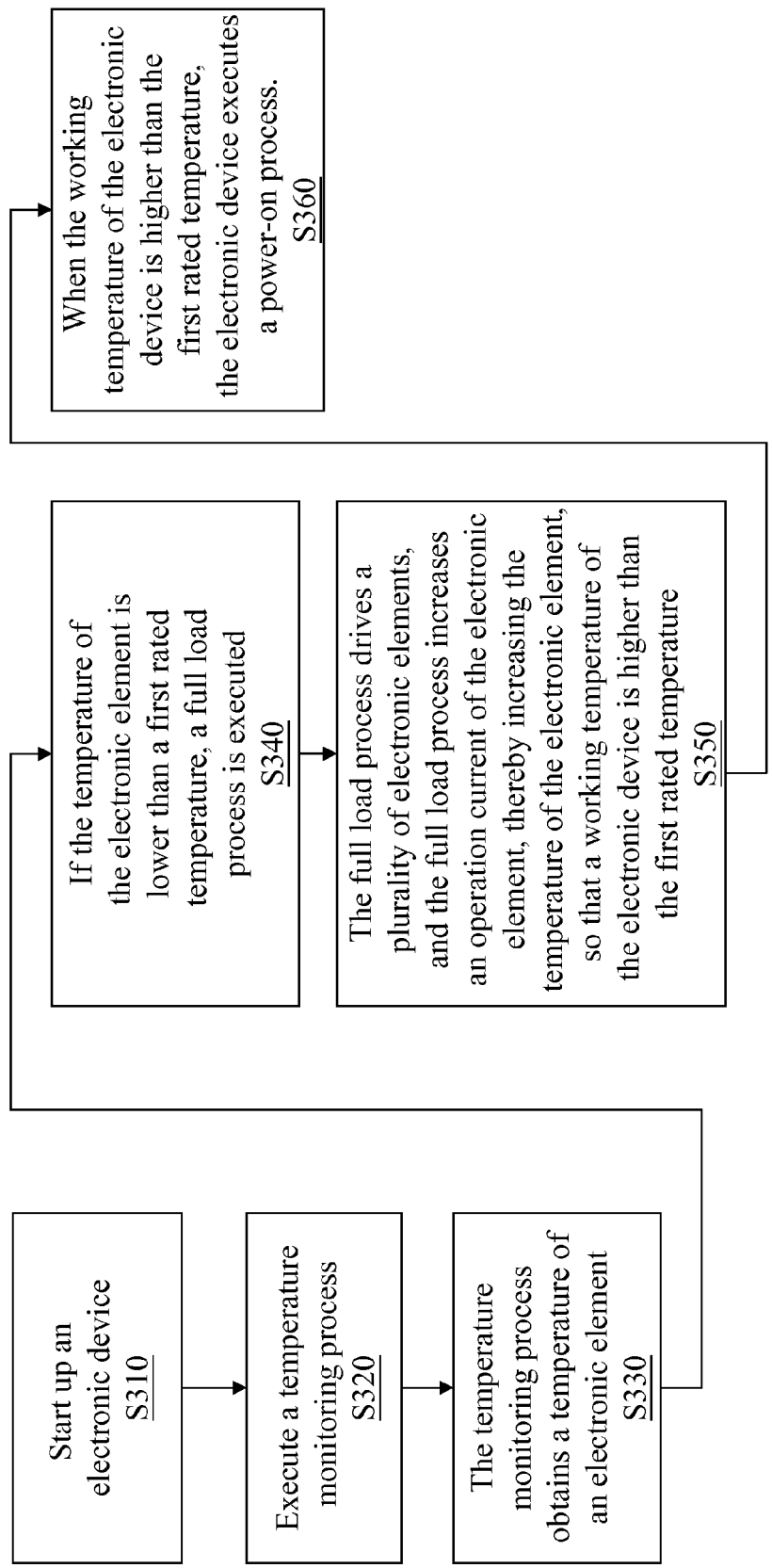
FIG. 3 is a schematic flow chart of an operation process according to the present invention.

After the electronic device 200 is powered on, the control unit 240 executes the following temperature regulation and control method according to an operation temperature of each of the electronic elements 220, thereby increasing the working temperature of the electronic device 200 to a proper working temperature. FIG. 3 is a schematic flow chart of an operation process according an embodiment of the present invention. Referring to FIG. 3, the process comprises the following steps.

In Step S310, an electronic device is started up.

In Step S320, a temperature monitoring process is executed.

In Step S330, the temperature monitoring process obtains a temperature of an electronic element.

In Step S340, if the temperature of the electronic element is lower than a first rated temperature, a full load process is executed.

In Step S350, the full load process drives a plurality of electronic elements, and the full load process increases an operation current of the electronic element, thereby increasing the temperature of the electronic element, so that a working temperature of the electronic device is higher than the first rated temperature.

In Step S360, when the working temperature of the electronic device is higher than the first rated temperature, the electronic device executes a power-on process.

When the electronic device 200 is started up, the control unit 240 of the electronic device 200 invokes the temperature monitoring process through the stored BIOS (or boot loader), thereby acquiring the current temperature of the electronic device 200. The electronic device 200 may not operate normally in a low-temperature state, because the electronic elements 220 have respective working temperatures.

Hence, each of the electronic elements 220 in the electronic device 200 is used to regulate and increase the temperature. The control unit 240 drives the plurality of electronic elements 220 through the temperature monitoring process, thereby increasing the temperatures of the electronic elements 220. In the embodiment, a current repeatedly passes through each of the electronic elements 220, so that the electronic elements 220 can increase its temperature to a workable temperature in the low-temperature environment. In the embodiment, the current can pass through the electronic elements 220 by repeatedly performing a reset action or by increasing an operation current of the electronic elements 220.

According to an internal assembly of the electronic device 200, the electronic elements 220 are not disposed within the same region, so the temperatures of the electronic elements 220 are different from the integral temperature of the electronic device 200. In other words, a detected temperature of the electronic device 200 may be lower than the actual temperatures of the electronic elements 220. To ensure that all electronic elements 220 are at their operation temperatures, the lowest working temperature in the electronic elements 220 is set to a first rated temperature, which serves as an operation reference temperature of the electronic device 200. For example, it is assumed that a first electronic element, a second electronic element, a third electronic element, and a fourth electronic element are provided. The lowest working temperature of the first electronic element is −10 degrees, the lowest working temperature of the second electronic element is −15 degrees, the lowest working temperature of the third electronic element is 0 degrees, and the lowest working temperature of the fourth electronic element is 5 degrees. Thus, the first rated temperature is the lowest working temperature of the second electronic element. To further define the lowest operation temperature of the electronic elements 220, the lowest operation temperature of each of the electronic elements 220 is defined as a second rated temperature.

Figure 4:
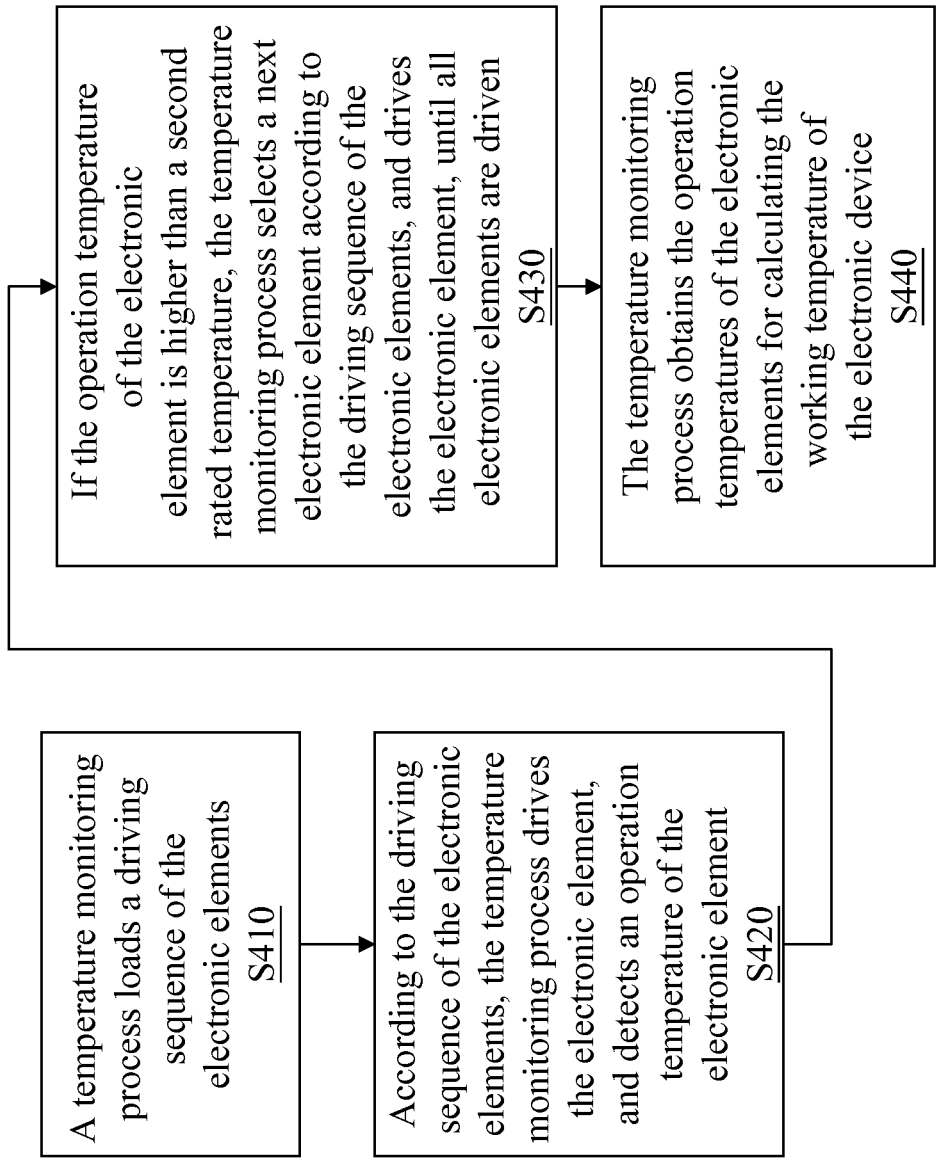
FIG. 4 shows an embodiment of driving the electronic elements.

To ensure that each electronic element 220 of the electronic device 200 can be at a normal working temperature, the present invention is illustrated through the following embodiments of driving the electronic elements 220. FIG. 4 is an embodiment of driving the electronic elements. Referring to FIG. 4, the embodiment comprises the following steps.

In Step S410, a temperature monitoring process loads a driving sequence of the electronic elements.

In Step S420, according to the driving sequence of the electronic elements, the temperature monitoring process drives the electronic element, and detects an operation temperature of the electronic element.

In Step S430, if the operation temperature of the electronic element is higher than a second rated temperature, the temperature monitoring process selects a next electronic element according to the driving sequence of the electronic elements, and drives the electronic element, until all electronic elements are driven.

In Step S440, the temperature monitoring process obtains the operation temperatures of the electronic elements for calculating the working temperature of the electronic device.

At first, the temperature monitoring process loads the driving sequence of the electronic elements 220. The electronic device 200 can only operate normally based on an operation sequence of different electronic elements 220. For example, after starting up, the control unit 240 obtains data to be processed from a memory, so as to maintain the computation data in the memory. Hence, the control unit 240 needs to send requirements to related peripherals through a south bridge chip/north bridge chip, thereby obtaining returned data of each of the peripherals, and stores the returned data in the memory temporarily. Then, to ensure that each electronic element 220 can operate smoothly, in this embodiment, when the electronic device 200 is started up, a driving sequence of the electronic elements 220 is used as a heating sequence. In the foregoing example, it is assumed that a startup sequence of the electronic elements 220 in the electronic device 200 is control unit→memory→south bridge chip→north bridge chip→display chip→network chip→audio chip, and this sequence is set as a driving sequence for heating the electronic elements 220. Further, a corresponding temperature detection unit 210 is disposed for each electronic element 220.

The heating manner in the embodiment of the present invention is performed by driving the electronic elements 220 with a current. The electronic elements 220 generate heat after receiving the current. Because the generated heat may not enable the electronic element 220 to reach the operable temperature for once, the temperature monitoring process sends currents continuously to drive the electronic elements 220, until a working temperature of the electronic element 220 driven currently reaches the second rated temperature.

After the working temperature of the electronic element 220 driven currently is higher than the second rated temperature, the temperature monitoring process selects a next electronic element 220 of the current electronic element 220 to serve as a next driven object according to the driving sequence of the electronic elements 220, until the temperature monitoring process accomplishes the heating of all electronic elements 220.

The temperature monitoring process obtains the operation temperatures of the electronic elements 220 for calculating the working temperature of the electronic device 200 to judge whether it reaches the first rated temperature. Various manners, such as an average of the second rated temperatures of all the electronic elements 220, an average of the working temperatures of all the electronic elements 220 or a temperature detected within the electronic device 200, can be utilized to calculate the first rated temperature.

Figure 5:
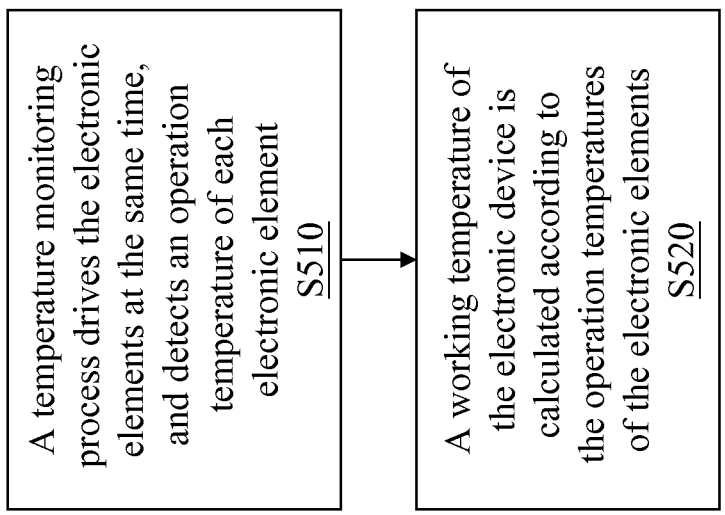
FIG. 5 shows another embodiment of driving the electronic elements.

Except the driving manner of the electronic elements 220, FIG. 5 shows another embodiment of driving the electronic elements 220. Referring to FIG. 5, this embodiment comprises the following steps.

In Step S510, a temperature monitoring process drives the electronic elements at the same time, and detects an operation temperature of each electronic element.

In Step S520, a working temperature of the electronic device is calculated according to the operation temperatures of the electronic elements.

The temperature monitoring process directly sends a current to all electronic elements 220 to perform driving, so that all the electronic elements 220 are heated simultaneously. The temperature monitoring process detects in real time whether the operation temperature of each electronic element 220 reaches a respective second rated temperature. If a part of the electronic elements 220 reach the second rated temperatures, the temperature monitoring process can send a current at a constant frequency, so that the electronic elements 220 maintain their operation temperatures. For other electronic elements 220 not reaching the second rated temperatures, the temperature monitoring process continuously sends the current to enable the electronic elements 220 to be continuously heated.

Figure 6:
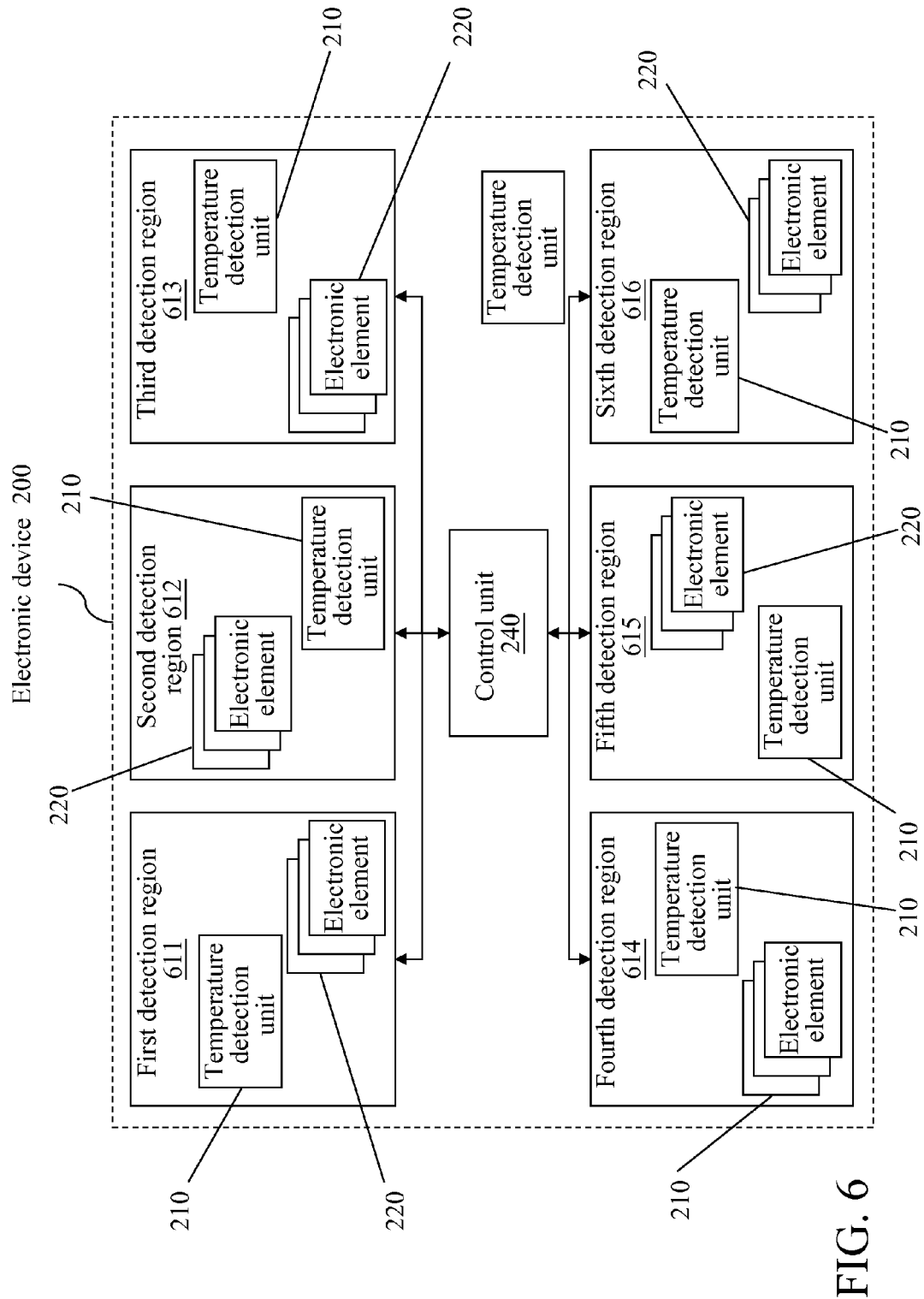
FIG. 6 is a schematic view of an embodiment of another temperature detection unit.

In this embodiment, a corresponding temperature detection unit 210 can also be assigned for each electronic element 220, or the electronic device 200 can also be divided into a plurality of regions being detected. Each region is assigned with one temperature detection unit 210, and all electronic elements 220 in the region are monitored by the temperature detection unit 210, as shown in FIG. 6. The control unit 240 only needs to compare temperatures returned by the temperature detection units 210, thereby deciding whether to execute a temperature monitoring process. For example, in FIG. 6, six detection regions (611, 612, 613, 614, 615, and 616) are defined in the electronic device 200, which are a first detection region 611, a second detection region 612, a third detection region 613, a fourth detection region 614, a fifth detection region 615, and a sixth detection region 616 respectively (however, the number of the detection regions is not limited in the present invention). Different wiring manners of the electronic elements 220 in each detection region make the arrangement of the electronic elements 220 different, so locations of the temperature detection units 210 of the detection regions are also different.

Figure 7:
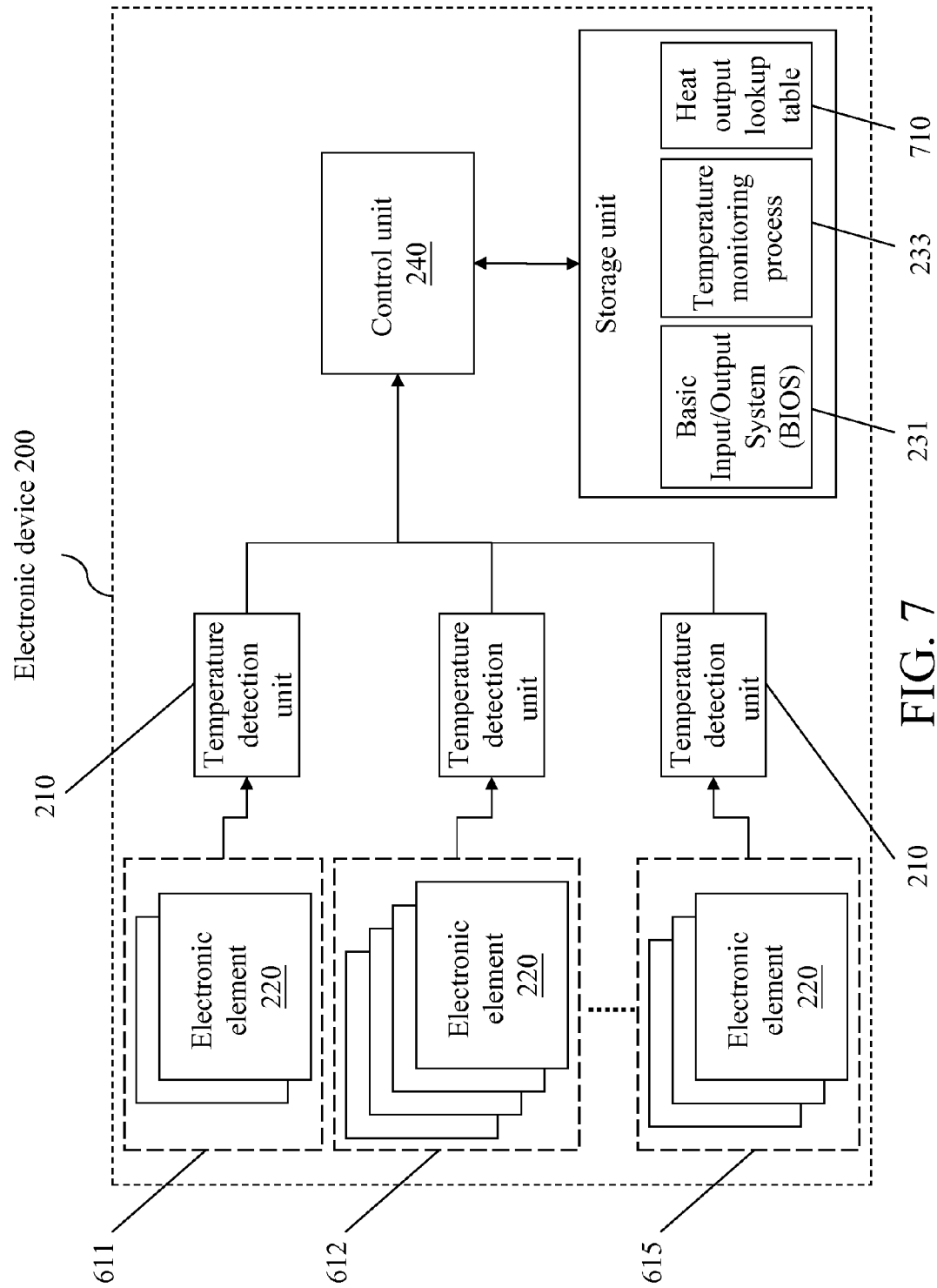
FIG. 7 is a schematic view of a third embodiment according to the present invention.

FIG. 7 is a schematic view of a third embodiment according to the present invention. Referring to FIG. 7, a heat output lookup table 710 is provided in the third embodiment. The storage unit 230 stores the heat output lookup table 710. The heat output lookup table 710 is used to record a heat output value generated by each electronic element 220 during operation. Taking the electronic device 200 in FIG. 6 as an example, because the number of electronic elements 220 in each detection region is not same, and heating efficiency of each electronic element 220 is different, a heat output value of each detection region can be further defined in the heat output lookup table 710 according to the heat output values of the electronic elements 220. The control unit 240 can decide a driving sequence of the detection regions according to the heat output values of different detection regions. For example, if a heat output value of a north bridge chip is the highest among all electronic elements 220, the electronic elements 220 in the detection region having the north bridge chip is driven at first. The control unit 240 can calculate a shortest heating time according to the heat output values of the electronic elements 220. In this way, the heat generated by the north bridge chip can influence other electronic elements 220 in the same detection region.

When the working temperature of the electronic device 200 is higher than a first rated temperature, it indicates that the electronic device 200 can operate normally. Thus, the electronic device 200 can start to execute power-on related services.

Figure 8:
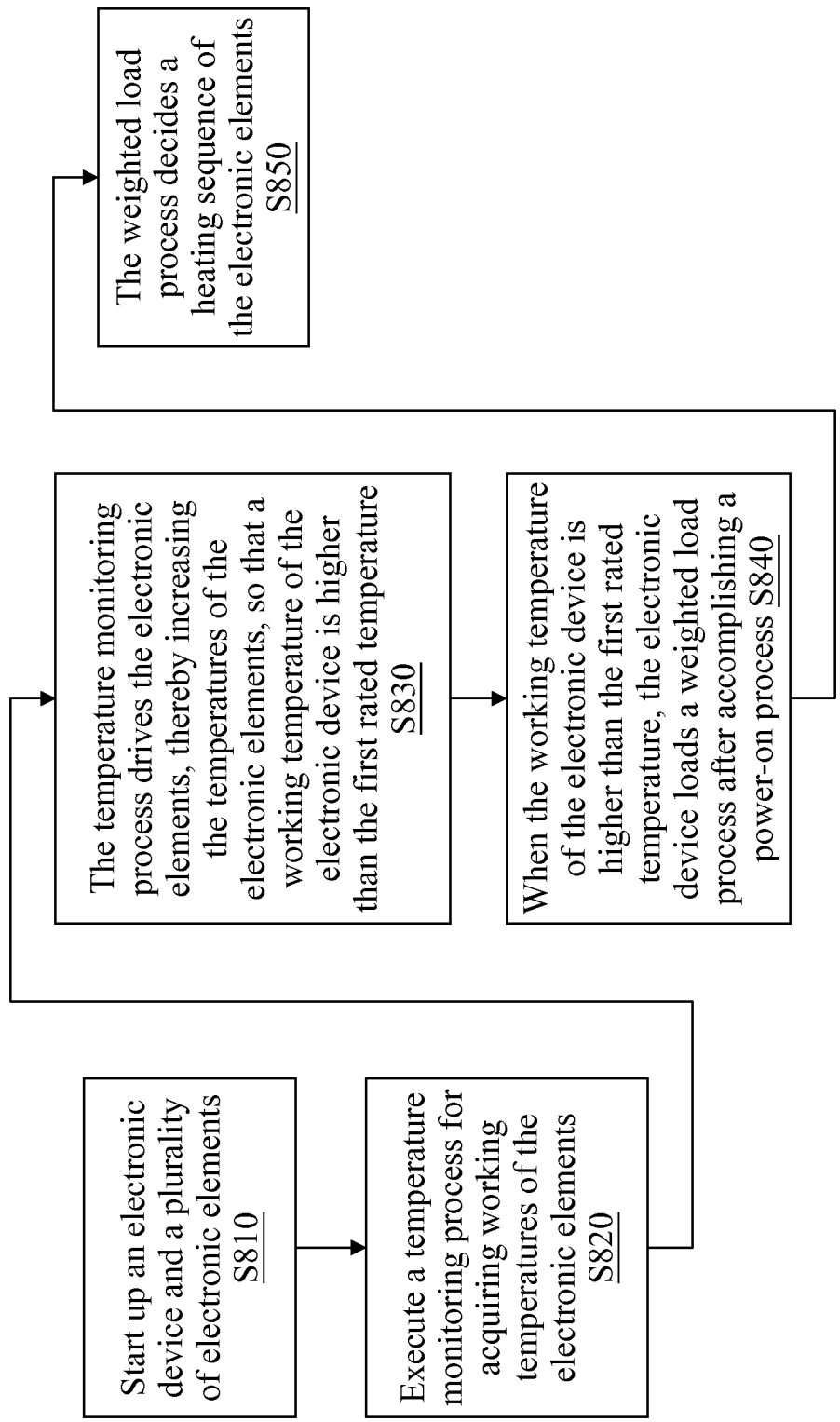
FIG. 8 is a schematic view of a fourth embodiment according to the present invention.

In addition to executing the heating in the power-on procedure of the electronic device 200, the present invention can further perform heating through an operating system 234 (or a corresponding execution process) after the power-on. FIG. 8 is a schematic view of a fourth embodiment according to the present invention. Referring to FIG. 8, the embodiment comprises the following steps.

In Step S810, an electronic device and a plurality of electronic elements are started up.

In Step S820, a temperature monitoring process is executed for acquiring working temperatures of the electronic elements.

In Step S830, the temperature monitoring process drives the electronic elements, thereby increasing the temperatures of the electronic elements, so that a working temperature of the electronic device is higher than the first rated temperature.

In Step S840, when the working temperature of the electronic device is higher than the first rated temperature, the electronic device loads a weighted load process after accomplishing a power-on process.

In Step S850, the weighted load process decides a heating sequence of the electronic elements.

Steps S810 to S830 of this embodiment are the same as those of the switch-on procedure of the foregoing embodiments, and will not be described again any more. After the electronic device 200 reaches the first rated temperature in the switch-on procedure, the electronic device 200 executes a corresponding weighted load process 910. Taking a personal computer as an example, after the personal computer accomplishes heating of the switch-on procedure, the personal computer starts to execute the operating system 234. Besides, taking a multimedia player as an example, after accomplishing heating in the power-on procedure, the multimedia player executes play and display related processes (such as the playing interface and playing program).

Figure 9A:
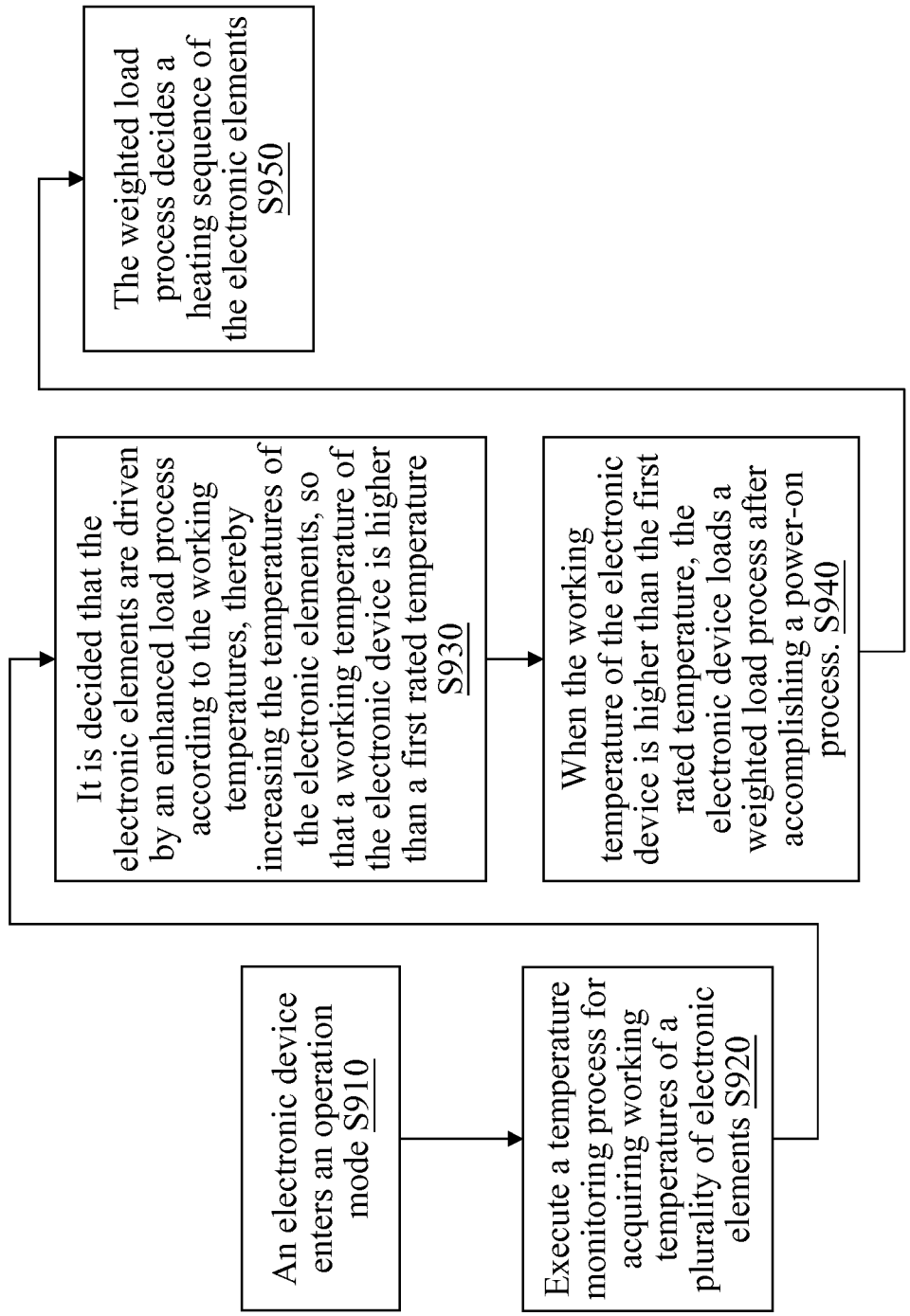
FIG. 9A is a schematic flow chart of a fifth embodiment according to the present invention.
Figure 9B:
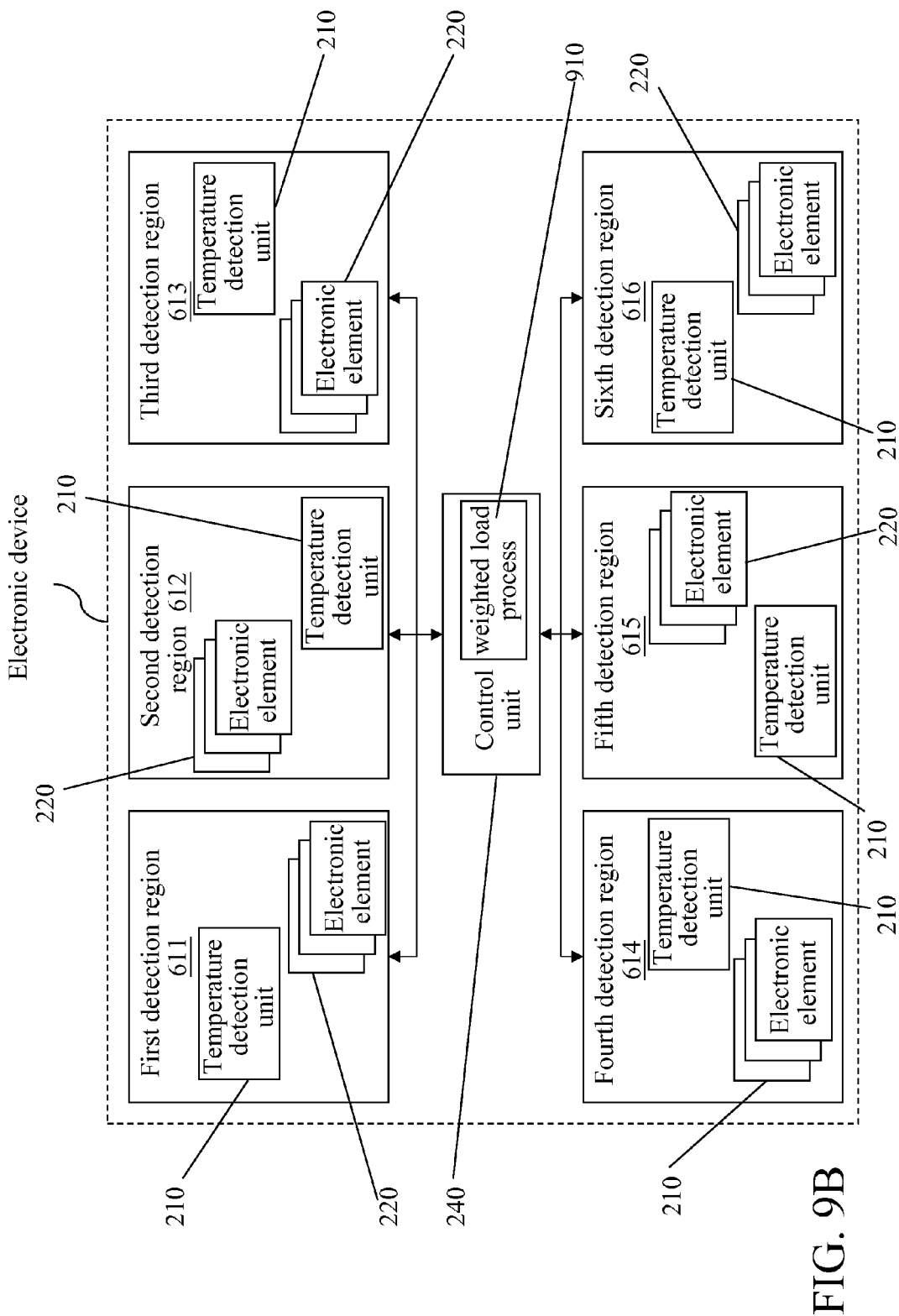
FIG. 9B is a schematic architectural view of the fifth embodiment according to the present invention.

After the electronic device 200 enters the operating system 234 (or the playing program), the electronic device 200 loads the weighted load process 910. The weighted load process 910 can record a preset heating sequence of the electronic elements, and can also decide a heating sequence of the electronic elements according to the current temperature of the electronic device 200. For this embodiment, in addition to the setting of the heating sequence of a plurality of electronic elements, the heating may also be performed in different regions. To clearly illustrate a procedure for deciding the heating sequence of different regions, the plurality of detection regions of the third embodiment are further illustrated as a fifth embodiment, as shown in FIGS. 9A and 9B.

In Step S910, an electronic device enters an operation mode.

In Step S920, a temperature monitoring process is executed for acquiring working temperatures of a plurality of electronic elements.

In Step S930, it is decided that the electronic elements are driven by an enhanced load process according to the working temperatures, thereby increasing the temperatures of the electronic elements, so that a working temperature of the electronic device is higher than a first rated temperature.

In Step S940, when the working temperature of the electronic device is higher than the first rated temperature, the electronic device loads a weighted load process after accomplishing a power-on process.

In Step S950, the weighted load process decides a heating sequence of the electronic elements.

After the electronic device 200 accomplishes the power-on heating process, the electronic device 200 enters a related operating system 234 (or an application). The electronic device 200 performs subsequent heating processing. At first, the electronic device 200 is divided into a plurality of detection regions, as shown in FIG. 9B. A temperature monitor unit is disposed in each detection region for monitoring a plurality of electronic elements in the detection region. During the power-on procedure of the electronic device 200, the temperature monitoring process is executed to acquire region temperatures of the detection regions (611, 612, 613, 614, 615, and 616). It is decided that the electronic elements are driven by an enhanced load process according to the working temperatures, thereby increasing the temperatures of the electronic elements, so that a working temperature of the electronic device is higher than a first rated temperature. And the weighted load process 910 selects one of the detection regions, and sends a computation instruction to the electronic elements in the selected detection region, so as to increase region temperatures of detection regions adjacent to the selected detection region. In other words, the weighted load process 910 runs a corresponding process on adjacent detection regions according to the temperatures of different regions, thereby driving the electronic elements in each detection region. By heating the adjacent detection regions, the temperature of the selected detection region rises. The weighted load process issues a click rise instruction to the electronic elements 220 continuously. The weighted load process can be set to issue the click rise instruction to the electronic elements 220 at a time interval according to a certain frequency, so that the electronic elements 220 can achieve full load within a certain time, so as to increase the temperatures of the electronic elements 220.

An electronic device 200 capable of temperature regulation and control and a regulation and control method thereof according to the present invention can maintain an operation temperature of the electronic device 200 in a low-temperature environment, so that related applications can stably run on the electronic device.

What is claimed is:

1. An electronic device capable of starting up in a low-temperature environment, wherein when the electronic device performs a power-on procedure in the low-temperature environment, a temperature of the electronic device is increased through operations of a plurality of electronic elements, the electronic device comprising:
    at least one temperature detection unit, connected to the electronic elements;
    a storage unit, for storing a temperature monitoring process and a full load process; and
    a control unit, electrically connected to the temperature detection unit, the electronic elements, and the storage unit;
    wherein the control unit acquires an operation temperature of the electronic element through the temperature detection unit, the control unit executes the temperature monitoring process and the full load process, the full load process repeatedly resets the electronic device, and drives the electronic elements through a current each time the electronic device is reset, so that a current temperature of the electronic element is higher than a second rated temperature of the electronic elements, and the temperature monitoring process calculates a working temperature of the electronic device according to the current temperatures of all the electronic elements, and judges whether the working temperature is higher than a first rated temperature.

2. The electronic device capable of starting up in the low-temperature environment according to claim 1, wherein the storage unit stores a heat output lookup table, and the heat output lookup table records a heat output value generated by each of the electronic elements when running, so that the control unit calculates the working temperature corresponding to the electronic device according to the heat output value of the electronic elements.

3. A startup method of an electronic device in a low-temperature environment, wherein when the electronic device is powered on in the low-temperature environment, a working temperature of the electronic device is increased, the startup method comprising:
    starting up the electronic device;
    executing a temperature monitoring process;
    obtaining temperatures of a plurality of electronic elements by the temperature monitoring process;
    if a temperature of one of the electronic elements is lower than a first rated temperature, executing a full load process;
    the full load process resetting the electronic device repeatedly, and driving the electronic elements by a current when the electronic device is reset, so as to increase the temperatures of the electronic elements, so that the working temperature of the electronic device is increased according to the increased temperatures of all the electronic elements; and
    when the working temperature of the electronic device is higher than the first rated temperature, executing a power-on process by the electronic device.

4. The startup method of the electronic device in the low-temperature environment according to claim 3, wherein a Basic Input/Output System (BIOS) or a boot loader executes the temperature monitoring process.

5. The startup method of the electronic device in the low-temperature environment according to claim 3, wherein the driving the electronic elements further comprises:
    loading a driving sequence of the electronic elements by the temperature monitoring process;
    according to the driving sequence of the electronic elements, the full load process increasing an operation current of a first electronic element of the electronic elements, and the temperature monitoring process detecting the temperature of the first electronic element;
    if the temperature of the first electronic element is higher than a second rated temperature, the full load process selecting a next electronic element according to the driving sequence of the electronic elements, and driving the next electronic element, until all the electronic elements are driven; and
    obtaining the temperatures of the electronic elements by the temperature monitoring process for calculating the working temperature of the electronic device.

6. The startup method of the electronic device in the low-temperature environment according to claim 3, wherein the driving the electronic element further comprises:
    the full load process driving the electronic elements simultaneously, and detecting temperatures of each of the electronic elements; and
    calculating the working temperature of the electronic device according to the temperatures of the electronic elements.

7. A startup method of an electronic device in a low-temperature environment, wherein after the electronic device is powered on in the low-temperature environment, a working temperature of the electronic device is increased, the startup method comprising:

the electronic device entering an operation mode;

executing a temperature monitoring process for acquiring temperatures of a plurality of electronic elements;

deciding to drive the electronic elements by an enhanced load process according to the temperatures of the electronic elements, so as to increase the temperatures of the electronic elements, so that the working temperature of the electronic device is increased according to the increased temperatures of the electronic elements;

when the working temperature of the electronic device is higher than a first rated temperature, the electronic device loading a weighted load process after accomplishing a power-on process; and deciding a heating sequence of the electronic elements by the weighted load process.

8. The startup method of the electronic device in the low-temperature environment according to claim 7, wherein the weighted load process issues a click rise instruction to the electronic elements continuously.

9. The startup method of the electronic device in the low-temperature environment according to claim 7, wherein after entering the operation mode, the startup method further comprises:

dividing the electronic device into a plurality of detection regions, wherein each of the detection regions comprises the electronic elements; and executing the temperature monitoring process for acquiring a region temperature of each of the detection regions.

10. The startup method of the electronic device in the low-temperature environment according to claim 9, wherein deciding the heating sequence of the electronic elements by the weighted load process further comprises:

the weighted load process selecting one of the detection regions, sending a computation instruction to the electronic elements in the selected detection region, and increasing the region temperatures of the detection regions adjacent to the selected detection region;

according to a heat output values of the electronic elements, the weighted load process selecting the electronic element with a maximum heat output value from the electronic elements; and through a current, driving and heating the electronic elements in the detection region having the selected electronic element.

* * * * *